March 22, 1955  W. A. BEDFORD, JR  2,704,680
FASTENING DEVICE
Filed Feb. 5, 1952
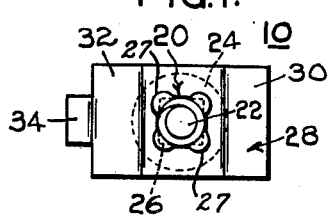
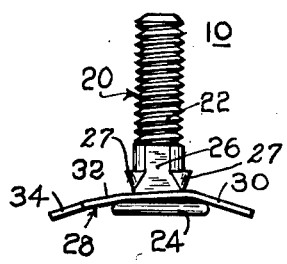
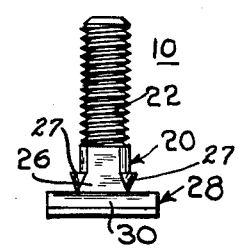
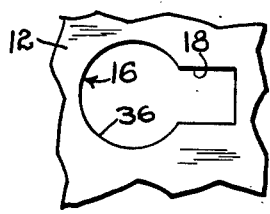
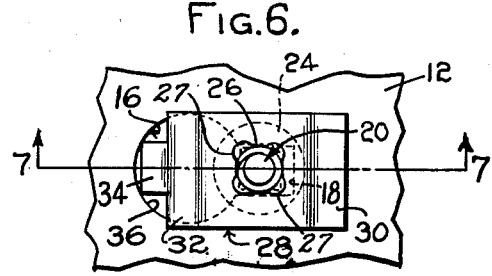
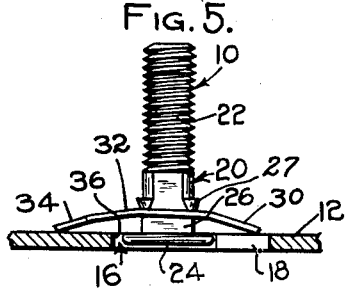
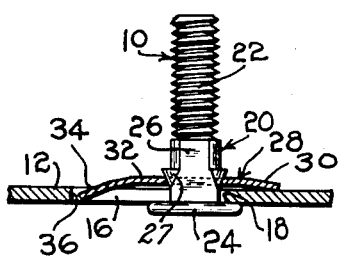
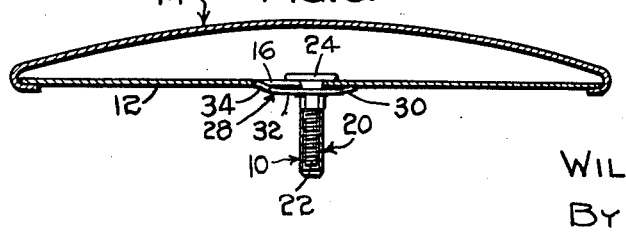
INVENTOR:
WILLIAM A. BEDFORD JR.,
By Robert E Ross
AGENT.

United States Patent Office 2,704,680
Patented Mar. 22, 1955

2,704,680

FASTENING DEVICE

William A. Bedford, Jr., North Scituate, Mass., assignor to United-Carr Fastener Corporation, Cambridge, Mass., a corporation of Massachusetts Application February 5, 1952, Serial No. 270,058

5 Claims. (Cl. 287—20.5)

This invention relates generally to fastening devices, and has particular reference to a two piece fastener assembly which is adapted for blind attachment to a supporting panel.

In the assembly of certain types of channel-shaped decorative moldings onto automobiles, it has been found necessary to preassemble into the molding a cross plate having bolts staked therein to enable the molding to be attached to the body of the car. However it has been found that shipment of such parts from the place of manufacture of the molding to the place of assembly of the automobile body presents considerable difficulty, due to the protruding bolts which tend to scratch and mar adjacent pieces of molding. Although in the assembly of many types of molding fasteners are provided which are adapted for assembly directly with the molding just prior to assembly onto the car body, in this particular type of molding, where the distance between the channel edges is several inches, molding fasteners large enough to extend from one inturned edge of the molding to the other would be too bulky and expensive.

The object of this invention is to provide a fastener assembly comprising a bolt and an attaching plate which are so assembled as to allow attachment to a supporting panel from one side thereof.

A further object of the invention is to provide a fastener assembly in which a headed bolt is provided with an attaching plate so assembled thereon that a section of a supporting panel may be received and gripped between the attaching plate and the head.

Other objects of the invention will, in part, be obvious and will, in part, appear hereinafter.

In the drawing:

Fig. 1 is a top plan view of a fastening device embodying the features of the invention;

Fig. 2 is a view in side elevation of the device of Fig. 1;

Fig. 3 is a view of the device of Fig. 2 as seen from the right side;

Fig. 4 is a plan view of a supporting panel having an opening of suitable shape to receive the fastener;

Fig. 5 is a view in side elevation illustrating the first step in the assembly of the fastener with the supporting member;

Fig. 6 is a top plan view of the fastener completely assembled with the panel;

Fig. 7 is a view in section taken on line 7—7 of Fig. 6; and

Fig. 8 is a view in section of a molding having a cross plate with a fastener having the features of the invention assembled therewith.

Referring to the drawing, there is illustrated a fastening device 10, which is adapted for attachment to a supporting panel 12. The panel 12 may be the cross plate of a channeled molding 14, and is provided with an aperture 16 and a slot 18 connecting to the aperture, the two forming what is commonly termed a "keyhole slot."

The fastening device 10 comprises generally a bolt 20 having a threaded shank 22, a head 24 on one end of the shank, a squared portion 26 disposed on the shank between the threaded portion and the head, and projecting stop members 27 disposed on the squared portion in spaced relation to the head. An attaching plate 28 is assembled onto the squared portion 26 so as to be non-rotatable thereon. The plate 28 is capable of longitudinal movement thereon into a position spaced from the head to enable a section of the supporting panel to be received therebetween as will be hereinafter described. The plate 28 is preferably formed of resilient material, and has end portions 30 and 32 which are inclined generally toward the plane of the head. One end portion 30 is provided with a tongue 34 which protrudes centrally therefrom.

To assemble the fastening device with the supporting panel 12, the head 24 of the bolt is inserted through the aperture 16 (see Fig. 5), and the bolt is then moved laterally so that the squared portion of the shank passes into the slot 18 (see Figs. 6 and 7). During the insertion the ends 30 and 32 of the attaching plate are flexed by contact with the supporting panel, and when the bolt is moved to pass the shank into the slot, the ends of the attaching plate are flexed until the head is far enough into the opening to allow the bolt to be moved transversely in relation thereto to pass the squared portion of the shank into the slot 18. The slot 18 and the squared portion 26 of the shank are so sized in relation to each other that although the squared portion can easily enter the slot, after such entry rotation of the bolt in the slot is prevented. As the squared portion reaches the bottom of the slot, the end 32 of the attaching plate moves across the aperture so that the tongue 34 snaps into the aperture and bears against the panel edge 36 at a point substantially opposite the slot (see Figs. 6 and 7). The attaching plate 28 is sufficiently wide that it completely spans the aperture, thereby preventing the tongue from passing too far into the opening, and properly positions the end of the tongue to enable it to abut the panel edge 36. The bolt is thereby held firmly in position on the supporting panel, with the threaded portion protruding therefrom.

As stated above, prior types of assemblies required that the bolts be assembled into the cross piece before the cross piece was assembled with the molding. However, the present type of fastener device may be assembled into the cross piece immediately before the molding is assembled onto the automobile body, and for this reason, by the use of these fasteners, the moldings may be shipped without the fasteners assembled, which greatly reduces the possibility of damage in shipment. The features of the invention may also be adapted for use with fasteners other than bolts. For example, in some cases a snap fastener stud may be used in place of the threaded shank of the bolt.

Since certain other obvious modifications may be made in the device without departing from the scope of the invention, it is intended that all matter contained herein be interpreted in an illustrative and not in a limiting sense.

I claim:

1. In a fastener assembly, comprising a supporting panel having an opening therethrough and a slot connecting to the opening, a fastening device assembled with the panel, comprising a bolt having a threaded shank and a head on one end thereof, said head being of a size to pass through the opening and wider than the slot, the head being disposed on one side of the panel, said shank being disposed in said slot, and an attaching plate wider than the slot carried by the shank on the side of the panel opposite the head, said attaching plate being formed of resilient material and having an end portion which extends part way across the opening, and a tongue member extending from said end portion into abutting relation with the edge of the opening opposite the slot.

2. In a fastener assembly, comprising a supporting panel having an opening therethrough and a slot connecting to the opening, a fastening device assembled with the panel, comprising a bolt having a threaded shank and a head on one end thereof, and a squared portion disposed between the head and the shank, said head being of a size to pass through the opening and wider than the slot, the head being disposed on one side of the panel, said squared portion of the shank being disposed in said slot, the relative dimensions of the squared portion and the slot being such that the squared portion is non-rotatable therein, and an attaching plate non-rotatably assembled on the squared portion of the shank on the side of the panel opposite the head, said attaching plate being formed of resilient material and having end portions inclined toward the plane of the head and bearing against the panel, one end of said attaching plate extending partially across the opening in the plate, and said end having a tongue member extending therefrom into abutting engagement with the edge of the opening at a point substantially opposite said slot.

3. A fastener element adapted for manual mounting in self-maintaining position on one of two members to be fastened together and by means of a keyhole slot in said member, said element comprising an enlarged head adapted to pass the enlarged portion of the slot and to bridge the sides of the extension thereof and an elongated shank, the portion of the shank remote from the head being formed for cooperation with another fastener element for securing the other member, a spring plate permanently mounted on said shank adjacent the head by means determining a maximum small space between the same and the lower surface of the head, said plate projecting past the periphery of said head and having an extension at one side which is normally deflected in the axial direction of the shank away from the end thereof and having a tongue member remote from the head still further projecting in that direction and formed with a shoulder transverse to a radial plane through said axis.

4. A fastener element adapted for manual mounting in self-maintaining position on one of two members to be fastened together and by means of a keyhole slot in said member, said element comprising an enlarged head adapted to pass the enlarged portion of the slot and to bridge the sides of the extension thereof and an elongated shank, having opposed flats on its sides immediately beneath the head to engage the walls of such extension of the slot and a screw thread on the portion of its shank more remote from the head, a spring plate permanently mounted on said shank adjacent the head by means determining a maximum small space between the same and the lower surface of the head, said plate projecting past the periphery of said head and having an extension at one side which is normally deflected in the axial direction of the shank away from the end thereof and having a tongue member remote from the head still further projecting in that direction and formed with a shoulder transverse to a radial plane through said axis.

5. A fastener element adapted for manual mounting in self-maintaining position on one of two members to be fastened together and by means of a keyhole slot in said member said element constituting one element of a screw-threaded fastening embodying male and female parts and comprising an enlarged head adapted to pass the enlarged portion of the slot and to bridge the sides of the extension thereof and a shank having screw threads, the shank having opposed flats on the sides immediately beneath the head to engage the walls of such extension, a spring plate permanently mounted on said shank adjacent the head by means determining a maximum small space between the same and the lower surface of the head, said plate projecting past the periphery of said head and having an extension at one side which is normally deflected in the axial direction of the shank away from the end thereof and having a tongue member remote from the head still further projecting in that direction and formed with a shoulder transverse to a radial plane through said axis.

References Cited in the file of this patent

UNITED STATES PATENTS

| 1,577,193 | Reed | Mar. 16, 1926 |
| 1,604,875 | Bogaty | Oct. 26, 1926 |
| 1,772,835 | Jurad | Aug. 12, 1930 |
| 2,246,457 | Schultz | June 17, 1941 |
| 2,531,348 | Amesbury | Nov. 21, 1950 |